March 1, 1955  R. H. SAVAGE  2,703,372
MINIMIZING BRUSH WEAR IN ELECTRICAL MACHINES
Filed March 1, 1951  3 Sheets-Sheet 1
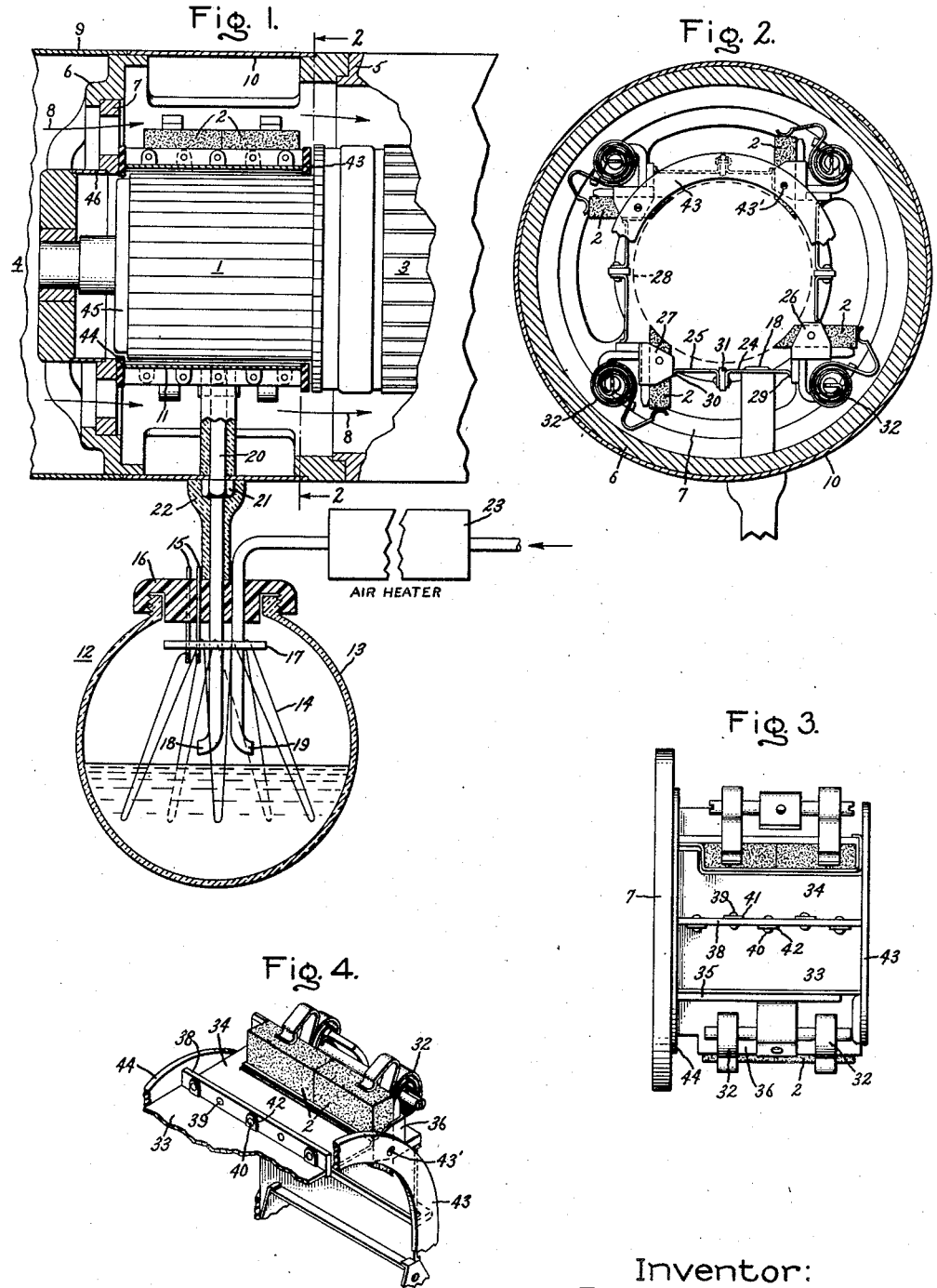
Inventor:
Robert H. Savage,
by Paul A. Frank
His Attorney.

March 1, 1955
R. H. SAVAGE
2,703,372
MINIMIZING BRUSH WEAR IN ELECTRICAL MACHINES
Filed March 1, 1951
3 Sheets-Sheet 2
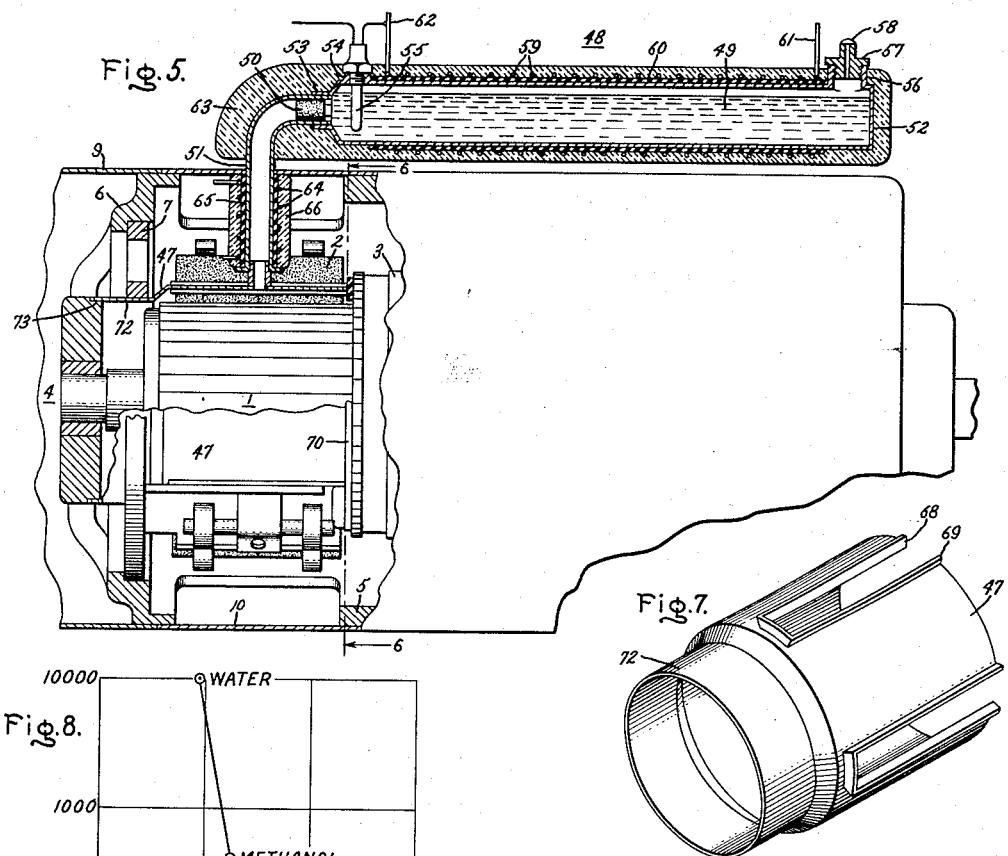
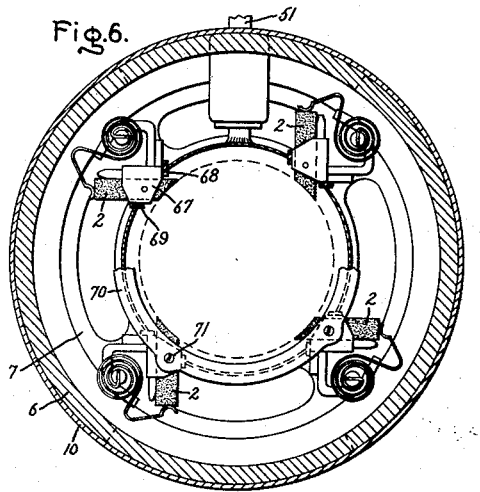
Inventor:
Robert H. Savage,
by Paul A. Frank
His Attorney.

March 1, 1955 R. H. SAVAGE 2,703,372
MINIMIZING BRUSH WEAR IN ELECTRICAL MACHINES
Filed March 1, 1951 3 Sheets-Sheet 3
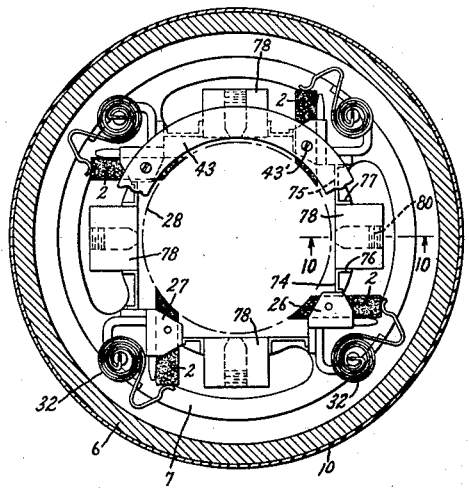
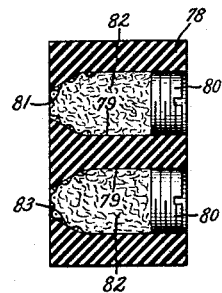
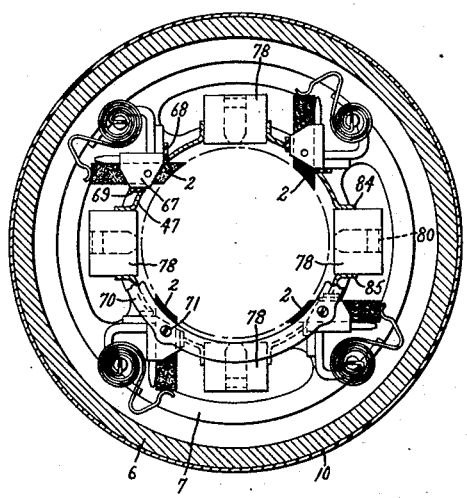
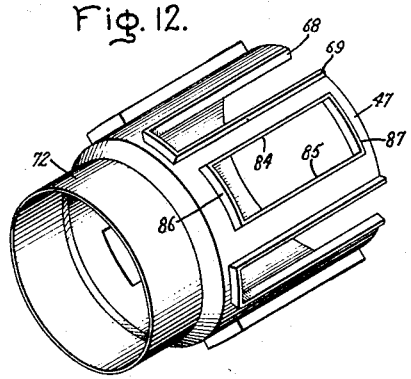
Inventor:
Robert H. Savage,
by Paul A. Frank
His Attorney.

United States Patent Office 2,703,372
Patented Mar. 1, 1955

2,703,372

MINIMIZING BRUSH WEAR IN ELECTRICAL MACHINES

Robert H. Savage, Scotia, N. Y., assignor to General Electric Company, a corporation of New York Application March 1, 1951, Serial No. 213,385

14 Claims. (Cl. 310—228)

My invention relates to means and methods for minimizing brush wear, or wear between a current collector device and an engaging contact member, in electrical machines, and more particularly to the provision of a housing enclosing the current collector device of an electrical machine in a partially airtight chamber, together with means for injecting a vapor into the chamber. My invention applies particularly to dynamoelectric machines comprising a current collector device and current collector contact member which are to be used in regions of low humidity and is a continuation-in-part of application Serial No. 102,028, filed June 29, 1949, now abandoned, and assigned to the same assignee as the present invention.

A general object of my invention is to reduce wear of a current collector contact member engaging the current collector device in an electrical machine.

With the advent of high altitude aircraft, the problem of excessive brush wear in dynamoelectric machines, particularly direct current generators, for use in such aircraft, has become a very serious one, and of great importance because of the relatively large amount of electrical equipment now required and the resultant necessity for reliable high current generators. In recent years a great many attempts have been made to find a suitable treatment for brushes to prevent their rapid wear and thus adapt existing machines to high altitude operation, but no treatment has yet been found which provides thoroughly practical results.

Neither untreated nor treated brushes now in use in aircraft direct current generators, for example, may be consistently depended upon to last, at altitudes greater than about ten thousand feet, for more than a few hours, and such brushes often wear out completely in only a few minutes. Furthermore, certain types of treated brushes have undesirable electrical characteristics or other qualities.

In accordance with my invention, wherein a brush and collector housing is provided, which is supplied with humidified air or vapor from a vapor source, ordinary untreated brushes may last several thousand hours even at altitudes of the order of 35,000 feet and more.

It is, accordingly, a general object of my invention to reduce or minimize wear between a current collector device and an engaging current collector contact member in an electrical machine for operation under low humidity conditions.

A more specific object is to provide in an electrical machine apparatus which will be effective to extend the useful life of current collector contact members, such as carbonaceous brushes, during operation in regions of low humidity.

A further object is to provide a method of operating electrical machines to reduce wear of a current collector contact member, or brush, therein.

While my invention is shown and described as applied to a particular type of direct current aircraft generator, it will be understood that the invention is applicable to other electrical machines of the type embodying a current collector device and engaging contact member. Machines having a collector device and engaging contact member embodying my invention may be operated in areas subject to low humidity conditions such that very rapid wear of the contact member or collector device, or both, would otherwise occur. For example, the invention is applicable to direct current aircraft motors, and generally to commutator motors and generators, for use in regions of very low temperature or low humidity, or both, such regions including, for example, the polar regions of the earth, desert regions, mountainous regions of great elevation, test chambers in which conditions of such regions are simulated, and cold storage or refrigerated rooms or chambers. My invention is also applicable to dynamoelectric machines wherein collector rings, rather than commutators, are employed, such as may be the case with alternating current synchronous machines or other electrical machines. While not limited thereto, my invention is particularly applicable to minimize wear of carbonaceous brushes employed as current collector contact members in electrical machines.

The novel features which I believed to be characteristic of my invention are set forth with particularity in the appended claims. My invention itself, however, both as to its organization and method of operation, together with further objects and advantages thereof may best be understood by reference to the following description taken in connection with the accompanying drawing in which Fig. 1 is a partially cutaway side view of a portion of a direct current aircraft generator provided with a commutator housing and a vapor generator in accord with my invention; Fig. 2 is a sectional view of a portion of the aircraft generator taken along line 2—2 of Fig. 1; Fig. 3 is a top view of the commutator housing portion of the aircraft generator of Fig. 1; Fig. 4 is a cutaway perspective view showing details of a portion of the aircraft generator of Fig. 1; Fig. 5 is a partially cutaway side view of an aircraft generator embodying a modified construction in accord with my invention; Figs. 6 and 7 are detail views of portions of the embodiment of my invention shown in Fig. 5, Fig. 6 being a sectional view along line 6—6 of Fig. 5, Fig. 7 a perspective view of the commutator housing member; Fig. 8 is a plot of minimum lubricating relative humidity versus the molecular chain length of the vapor producing material; Fig. 9 is similar to Fig. 2 but showing an internal vapor source; Fig. 10 is a view taken along the line 10—10 of Fig. 9; Fig. 11 is similar to Fig. 6 but showing an internal vapor source and Fig. 12 is similar to Fig. 7 but showing mounting means for an internal vapor source.

As used herein the term "current collector device" is intended to include both commutators and collector rings, and applies to the movable conductive members to or from which electric current is supplied by a brush or other current collector contact member in engagement therewith, which current is normally caused to flow through the coil or coils of the rotating part of the machine.

The term "current collector contact member" or "contact member" is intended to include not only the widely used carbonaceous brush but also other types of brushes and contact members adapted to contact or engage a commutator or collector ring, or the like, in relative slideable motion with respect thereto. The term "armature" is intended to include the rotating assembly of a dynamoelectric machine, whether the coil or coils forming a part thereof are provided with direct or alternating current and whether the current so supplied is furnished from the contact members in engagement with a commutator, collector rings or any other type of current collector device.

It has been known for many years that brush wear in rotating electrical machinery is much more rapid under conditions of very low humidity than under conditions of higher humidity. Aircraft generators, however, being as small and light as possible, are almost always cooled by a strong blast of air, and it has been impractical to attempt humidification of the large volume of air required to cool the generators. In accord with my invention it is possible and practicable with only a small amount of water, or other vaporizable substance, to maintain a reasonably high humidity or vapor pressure in the region of the collector device and brushes without interference with or reduction of the flow of cooling air through the generator. The power rating of the generator is not reduced by the modification thereof in accord with my invention, and the weight and size are affected to an insignicant extent. Furthermore, it has been found that machines incorporating my invention may have brush temperatures during operation considerably below those existing in similar machines which do not incorporate my invention, and the incorporation of my invention does not adversely affect the operation of the machine.

Fig. 1 shows the commutator end of an aircraft direct current generator incorporating my invention, the generator comprising a collector element 1, in the form of a commutator, and brushes 2 adapted to contact the rotating commutator segments. A conventional armature 3, shaft journal and bearing 4, and frame 5 are readily recognized. The end assembly 6 of the frame and brush supporting ring 7 of the generator are suitably slotted or provided with openings to permit a blast of cooling air to flow, as indicated by arrows 8, through the brush chamber and across the armature 3 thereafter to be exhausted from the remote end of the generator. A duct 9 is preferably employed to direct the air blast through the generator, the brush compartment being closed by a suitable band 10. This band is preferably split for convenience in disassembly of the generator, and held together at the split portion by any conventional and suitable means, such as a bolt and nut arranged to draw together upstanding flange portions of the band adjacent the slit to clamp the band about the frame 5. For the sake of simplification of the drawings, however, the band is shown as being solid and the slit and closing means are omitted therefrom.

Surrounding and in proximity to the surface of the commutator or collector device is a housing or shield 11, later to be described in detail, which forms a substantially airtight or gastight commutator chamber. In this chamber are located the commutator and the ends of the brushes in contact therewith, whereby the housing 11 prevents the cooling air blast from reaching the commutator and contacting brush ends. Vapor laden air, in the embodiment illustrated in Fig. 1, is introduced into this enclosed chamber from a vapor generator 12.

Since aircraft may maneuver violently, it is desirable that the vapor generator 12 be operable in any position. The generator shown in Fig. 1 meets this requirement and comprises a spherical globe or flask 13, which may be of glass, plastic, metal or other material, though preferably, if not an insulating material, coated internally to prevent possible short circuiting of portions of a grid or filament of thin resistance wire 14. Stainless steel or Nichrome are suitable materials for wire 14. The grid is supplied with current from conductors 15 extending through a closure plug or cap 16, which may be, for example, of rubber.

The grid of heating wire 14 is so arranged on the support 17 that several sections of the wire pass through the water surface in any position of the globe, and when heated, the wire causes increased evaporation from the water surface. Extending through the plug 16 in addition to conductors 15 are two tubular members 18 and 19 terminating near the center of the globe 13. The globe is somewhat less than half filled with water, or other suitable vaporizable substance, and accordingly, a liquid in the globe will not cover the end of either of tube 18 or 19 regardless of the position of the globe. Tube 18 communicates with the interior of the commutator housing 11 through a nipple 20, which is carried by the shield 11 and which extends through band 10. The end of the nipple is externally threaded to receive a packing nut 21 into which the tube 18 is flared. Lagging 22 is applied around tube 18, nipple 20 and nut 21 to mbinimize cooling thereof and resultant undesirable condensation therein. It may also be found desirable to provide heat insulation for globe 13 under certain conditions, but if the globe is not in an exposed position subject to a blast of cold air, such insulation will probably not be found necessary. Tube 18 and nipple 20 thus define an insulated passageway communicating between the vapor generator 12 and the commutator chamber to introduce vapor into the latter.

Tube 19 is arranged to furnish warm air to the interior of globe 13, and air heater 23, which may be of any desired construction, and which may be only a suitably energized resistance wire wound about tube 19, is preferably provided in circuit with tube 19 to heat the air so furnished. The heater may consume in the order of 15 watts under average conditions. The air supplied through the tube and heater to the globe is preferably at somewhat greater than the ambient pressure and is conveniently drawn from the air blast in duct 9. Recirculation by drawing air from the commutator chamber through an additional small conduit similar to nipple 20 is practicable and may make unnecessary the provision of heater 23 since the air thus drawn from the chamber will be warm. If the air is to be recirculated in this manner, a low capacity air pump may be employed to force the air to circulate between the chamber and the vapor generator.

In operation, the vapor generator 12 provides a small amount of moist air to the interior of the commutator shield 11. Grid wire 14 is heated by current supplied through connections 15 from any suitable source, the current value and wire resistance being proportioned to provide evaporation or vaporization of the water, or other liquid, in the globe 13 at a rate in the order of 5 grams per hour when used with a 400 ampere aircraft generator and when from about 2 to 10 liters of air per minute are supplied through tube 19 to the globe. These rates are exemplary only and vary with the leakage from the commutator chamber and with other conditions. The rate of vaporization mentioned above may require that wire 14 be heated by only about 15 watts of power, although more power and a greater rate of evaporation are often found desirable. The wire is preferably supplied with current enough merely to maintain the wire above the water surface at the threshold of color, although more or less current may be found desirable. Under these conditions, vaporization of the water occurs over the entire water surface, the vaporization rate per unit area of surface being greatest at the meniscus of water on the wire. The whole volume of water in the globe is not necessarily substantially heated, and it has been found that many other liquids may be used in the system, among which are alcohols, ethers, esters, ketones, hydrocarbons, alcohol-ethers, aldehydes, acetals, acids, amides, amines, other derivatives, and other organic substances, and these may or may not be mixed with water as may be found desirable. Alternatively, certain subliming solids may be employed, which may be heated sufficiently to maintain an adequate vapor pressure. Camphor and ice are two such solids.

In general, I have found that carbophilic organic materials having certain characteristics are also very efficient lubricant vapor producers for carbon brushes. For example, it has been determined that the minimum lubricating relative humidity of many such materials is very low and in some cases only one one-thousandth or less than that when using water vapor. By minimum lubricating relative humidity is meant the ratio between the minimum pressure at which a carbon brush is lubricated and the saturation pressure of the material. For convenience, these values are expressed as at 30° C. and in millimeters of mercury. For example, the minimum lubricating pressure ($P_1$) for water is 3 mm. Hg while the saturation pressure ($P_0$) at 30° C. is 31.8 mm. Hg. Thus the relative minimum lubricating pressure is 3 divided by 31.8 or about 0.1. For ethylene glycol $P_1$ is less than 0.0018 mm. Hg and $P_0$ is 0.15 mm. Hg and $P_1/P_0$ is about 0.0001 or less. For methanol $P_1$ is 0.650, $P_0$ is 160 and $P_1/P_0$ is 0.00406. It has further been found that the minimum lubricating relative humidity decreases logarithmically with linear increase in the effective molecular size expressed as chain length or sectional area up to the point approaching that at which the vapor pressure of the material becomes too low to evaporate at a perceptible rate. This relationship is shown in Fig. 8 wherein the minimum lubricating relative humidity$\times 10^5$ or $P_1/P_0 \times 10^5$ is plotted against the molecular chain length of the material in angstroms (Å). There are presented in Table I below characteristic examples of materials which are useful in the present respect.

*Table I*

| Compound | $P_1$ Minimum Lubricating Pressure, mm. Hg | $P_0$ Saturation Pressure (Liquid @ 30° C.), mm. Hg | $P_1/P_0$ Minimum Lubricating Rel. "humidity" $\times 10^5$ | $l_m$ Effective Molecular Chain Length, Å. | $A_m$ Effective Molecular Sect. Area Å$^2$ |
|---|---|---|---|---|---|
| Water | 3.+ | 31.8 | 10,000 | 4.64 | 10 |
| Methane | >>600 | 190,000 | high | 4.69 | 13 |
| Methanol | 0.650 | 160 | 406 | 6.14 | 28 |
| Carbon Tetrachloride | 0.052 | 125 | 41.6 | 7.12 | 28 |
| Propane | 2.9 | 10,000 | 29 | 7.72 | 36 |
| Propanol | 0.0044 | 28 | 15.7 | 9.22 | 43 |
| Ethylene Glycol | <0.0018 | 0.15 | low | 9.18 | 43 |
| Pentane | 0.018 | 680 | 2.6 | 10.8 | 50 |
| 1-Bromo-pentane | 0.00027 | 13 | 2.1 | 12.35 | 57 |
| Heptane | 0.0008 | 56 | 1.4 | 13.88 | 64 |
| Diethylene Glycol | <0.001 | .013 | low | 13.76 | 64 |
| Triethylene Glycol | <0.001 | .002 | very low | 18.3 | 94 |
| Tetraethylene Glycol | very low | very low | do | 22.8 | 118 |
| Hexaethylene Glycol | do | do | do | 32 | 170 |

From the above data it will be noted that the organic materials are characterized by greatly improved lubricating qualities as compared to water, for example, which is included for comparison purposes.

Organic materials which are useful in the present respect, and of which those shown in Table I are exemplary, have a molecular area of from 20 to 6000 Å$^2$, a molecular chain length of from 6 to 400 Å, a vapor pressure at 100° C. of less than 20 mm. Hg, but enough to permit a perceptible evaporation rate, and a molecular weight of from 30 to 9000. Organic materials falling outside this range of characteristics generally require an excessive concentration for effective use or have inadequate vapor pressure to provide a lubricant vapor.

The broad range of characteristics of useful materials along with the preferred range of characteristics and the specific preferred range of materials is given in Table II below.

*Table II*

| | Molecular Area, Å$^2$ | Molecular Chain Length, Å | Vapor Pressure @ 100° C. mm. Hg | Molecular Weight |
|---|---|---|---|---|
| Inadequate | <20 | <6 | >20 | <30 |
| Broad Range | 20–6,000 | 6–400 | <20 | 30–9,000 |
| Preferred Range | 40–600 | 10–60 | <2 | 60–1,000 |
| Specific Preferred Range | 80–200 | 12–36 | <0.1 | 100–500 |
| Ineffective | >>600 | | Negligible | |

Using the data presented in Table II one skilled in the art can choose any of a great number of organic materials or mixtures thereof to produce vapors which are efficient lubricants for carbon brushes.

The specific construction and arrangement of shield 11 of Fig. 1 is best understood with reference to Figs. 2, 3 and 4. In Fig. 2, which is a sectional view taken along line 2—2 of Fig. 1, the shield or housing for the commutator is seen to comprise plates or members of a sheet material arranged between the brush holders. Plates 24 and 25, for example, extend between brush holders 26 and 27 so as to prevent the air in the blast, which flows through the elongated arcuate slots formed through brush ring 7, from reaching the commutator surface, which surface is represented by the dotted circle 28. Plate 24 is provided with a flange portion 29 sealed against brush holder 26 and attached thereto by welding, gluing, riveting or otherwise, and plate 25 is similarly sealed and attached at flange 30 to brush holder 27. Interposed between plates 24 and 25, approximately midway between brush holders 26 and 27, is an insulating strip member 31 to which the plates are riveted as later described. Member 31 serves to insulate electrically the plates from one another, thus preventing, in a convenient manner, short circuiting of the brush holders through the shield. Member 31 may extend inwardly nearly to the commutator surface to assist in maintaining air turbulence within the chamber formed by the housing, and this construction noticeably increases heat transfer from the commutator and brushes to the housing and brush holders, and thence to the cooling air blast. The housing, accordingly, actually assists in cooling the brushes and commutator. Plates similar to plates 24 and 25, separated by insulator strips similar to strip 31, are provided between each two successive brush holders as shown in Fig. 2 to completely encircle or surround the commutator.

Since the commutator and the engaging ends of the brushes are cooled by heat transfer through the turbulent air within the shield or housing to the housing and brush holders, the housing is preferably formed of a good heat conducting material, such as copper, aluminum, steel, or the like, and it may be desirable to provide fins extending outwardly from the shield, or from the brush holders, to remove heat more rapidly therefrom. Such fins have not been found essential, however, in the particular arrangement illustrated in Figs. 1 through 4, nor in the arrangement of Figs. 5 through 7, later to be described.

Humidified air is furnished the interior of the commutator housing from the vapor generator through a lagged tube passing through band 10 and through one of the housing plates, such as plate 24. The end of this tube, identified in Figs. 1 and 2 as tube 18, is expanded or crimped against the edges of a suitable opening in plate 24, as shown in Fig. 2, although any serviceable means of attachment of the tube 18 to plate 24 may be employed wherein the passageway of tube 18 communicates with the commutator chamber.

The brushes 2, brush holders, including holders 26 and 27, and brush springs 32 are of conventional and known construction. It will be apparent that the purposes of the shield or housing of this invention are best effectuated, however, when the brushes fit snugly in the brush holders to permit a minimum of air leakage into or out of the commutator chamber formed by the housing.

Fig. 3 is a top view of the housing and brushes within the commutator portion of the generator frame and shows, particularly, the arrangement of two typical plates 33 and 34, which correspond to the uppermost plates shown in dotted lines in Fig. 2. Plate 33 is rectangular in plan view and is secured by a flange portion to a member 35 which forms a part of the brush holder 36. Plate 34 is shaped to conform to the portion of brush holder 37 to which it is secured so as to fit thereagainst, as further seen in Fig. 4. Insulating strip member 38 is interposed between plates 33 and 34 and the plates are attached to the strip by means of rivets 39 and 40. Rivet 39 pierces an upstanding ear 41 of plate 34 and the insulating strip, holding the plate and strip firmly together. Rivet 40 similarly holds ear 42 of plate 33 to strip 38. Since ears 41 and 42 are displaced along the strip, rivet 39 is in electrical contact with plate 34 only, and rivet 40 is in electrical contact only with plate 33. Electrical insulation of plate 33 from plate 34 is, accordingly, maintained, such insulation being necessary to prevent a short circuit between the brushes when the plates of the housing are of an electrically conductive metal. It is possible, however, to omit this insulation if the housing is of electrically non-conductive material.

The construction of the shield is further shown in Fig. 4 wherein rivets 39 and 40 and ear 42 are identified and shown in perspective, together with plates 33 and 34, strip 38 and brush holder 36.

Fig. 4 also shows portions of two rings of insulating material 43 and 44 respectively. Rings 43 and 44 may be cemented to the brush holders or, as shown, fastened to the brush holders by bolts, such as bolt 43' threaded into brush holder 36.

The positions and dimensions of rings 43 and 44 relative to the other portions of the assembly are most readily understood with reference to Fig. 1 wherein ring 43 is seen to fit closely around the commutator surface and against the upstanding riser portion of the commutator at the end nearer the armature. In practice it has been found desirable to form ring 43 of dimensions such that originally it will be in contact with the commutator, thereafter to wear in during operation to fit as closely as possible against the adjacent portions of the commutator. Ring 44, disposed near the bearing end of the commutator, primarily furnishes a seal between the inner surface of the brush supporting ring 7 and the end of shield 11, although the ring may also be arranged, if desired, to be worn in against the commutator supporting drum 45. The seal between the bearing end of the commutator and the shield 11 is completed by the provision of a ring or band 46 fitting tightly against the brush supporting ring 7 on the one hand and against a solid central portion of end assembly 6 of the generator frame on the other. Thus the air blast is sealed from the shielded chamber by the shield 11, insulating ring 44, the inner portion of brush supporting ring 7, band 46, the solid inner portion of end assembly 6, across the closely fitted bearing and journal 4, and the end of the axial armature shaft. The space between the commutator supporting drum 45 and the solid central portion of end assembly 6, within band 46, is thus enclosed. If the inner wall of ring 44 is worn in against the drum 45 as suggested, an additional sealing of this end of the commutator chamber will be thus accomplished.

It will be understood that rings 43 and 44 are preferably sealed to the shield plates, such as plates 24, 25, 33 and 34 shown in Figs. 2, 3 and 4, by virtue of a close fit thereagainst or by means of a cement or sealing compound applied after assembly of the shield wherever necessary to fill cracks or openings.

While many possible modifications of construction will suggest themselves to adapt my invention to different models and types of direct current generators or other dynamoelectric machines, wherein a vaporizer or humidifier is arranged to maintain the desired degree of humidity or vapor pressure within a shield about the current collector device, or if desired, just as the area of contact of each brush with the collector device, a particularly advantageous modification of the shield construction, as well as a modified vapor generator are shown in Figs. 5, 6 and 7. It will be understood that the vapor generator 12 of Fig. 1 may be used with the shield of Figs. 5, 6 and 7, or that the vapor generator of Fig. 5 may be used with the shield of Figs. 1, 2, 3 and 4.

Fig. 5 is a partially sectional side view of a direct current generator embodying a commutator shield of the above-mentioned modified construction and a modified vapor generator operating on principles differing from those of the vapor generator of Fig. 1. While the vapor generator of Fig. 1 is arranged to provide humidified air to the commutator chamber, the vapor generator of Fig. 5 provides a gaseous medium consisting of a vapor alone, which mixes with or humidifies air leaking into the commutator chamber through those parts of the shield and the seals which are not completely airtight.

The commutator 1, brushes 2, armature 3, shaft journal and bearing 4, frame 5, end assembly 6, brush supporting ring 7, air blast duct 9 and band 10 of the generator of Fig. 5 may each be as described above for the generator of Fig. 1, and each functions in the same manner.

The commutator shield 47, shown in Fig. 5 is generally cylindrical, and vapor generator 48 contains a body of water or other vaporizable substance 49, which is raised in temperature to provide a slight positive vapor pressure. This pressure causes vapor to pass through a porous plug 50 and a tube 51 into the space inside the commutator shield 47.

Vapor generator 48 comprises an elongated cylindrical tank or flask 52, preferably of metal, having three openings, one opening being at a neck portion 53 communicating with tube 51 to provide vapor to the commutator chamber within shield 47, the second being through a collar 54 internally threaded to accept a thermostat 55, which functions to control the liquid temperature, and the third being arranged in conjunction with a short pipe 56 to permit filling of the tank. Pipe 56 is internally threaded and is normally closed by an externally threaded plug 57, which is removed for filling. Plug 57 is provided with an internal bore sealed by a small drop 58 of low melting point or frangible material, such as solder or sealing wax, and the plug thus functions as a blow out or safety plug to prevent excessive temperature or pressure within tank 52.

An electrical resistance heating element comprising resistance wire 59 is wound about tank 52 and insulated therefrom by an insulating coating or sheet 60. Terminals 61 and 62 are provided for the heating element and electrical power is supplied in series with thermostat 55 to these terminals from any desired source. Heat lagging or insulation 63 preferably covers the complete vapor generator 48 including tank 52 and wire 59, as well as tube 51.

Tube 51 passes through an opening provided in band 10 and communicates with the interior of the commutator chamber formed by shield 47, and the length of tube 51 between band 10 and shield 47, being in the main air blast, is heated by resistance wire 64 wound about electrical insulating jacket 65, and lagged with heat insulating material 66. Resistance wire 64 is connected to a power source to be continuously energized and with the described arrangement there should be no condensation within tube 51 of the vapor escaping through porous plug 50. Supporting means, not shown, are of course, provided for vapor generator 48 and may comprise straps holding it against or near the generator frame 5.

In the sectional view, Fig. 6, taken along line 6—6 of Fig. 5, the position of the shield 47 is clearly shown. In this construction, the metal conductive portions of the shield are grounded to the generator frame and each brush holder is insulated from the conductive portions of the shield. It will be understood that the housing 47 is preferably of electrically conductive metal and a good heat conductor, and that insulation from the brush holders is not necessary if the housing is of insulating material. Brush holder 67, for example, is sealed to the shield through interposed insulating strips 68 and 69. These strips are sealed along slots in the shield, as best shown in Fig. 7, by the use of a suitable insulating cement or sealing compound, and when the shield is placed in position over the brush holders as shown in Fig. 6, the insulating strips are similarly cemented or sealed to the brush holders. Ring 70 of insulating material is preferably bolted, by bolts 71, to each brush holder and is also sealed with a sealing compound to the body of the shield 47 to prevent air from flowing between these two members.

As shown best in Fig. 5, ring 70 is arranged to be worn in, to provide minimum clearance, against the cylindrical surface of the commutator and against the upstanding commutator riser portion near the armature. The manner in which the reduced diameter end section 72 of shield 47, as seen in Fig. 7, is fitted into the end assembly 6 at the commutator end of the machine is best recognized from a further consideration of Fig. 5. This reduced end section passes through the central opening of the brush supporting ring 7 and fits snugly over a circular shoulder 73 formed about the solid central portion on the inner face of the end assembly. Sealing compound may be necessary or desirable at this juncture to complete the seal. Since the portion of end assembly 6 lying between shoulder 73 and bearing 4 is solid, no air from the duct 9 can enter this end of shield 47.

In the description of both of the above embodiments of my invention, the use of a cement or sealing compound has been several times mentioned. A suitable material for this use is a modified alkyd resin coating or sealing composition and such composition may be useful to seal joints in the system other than those specifically mentioned to accomplish the purpose of making the collector device housing as airtight as is possible.

The rings 43 and 44 of Fig. 1 and ring 70 of Fig. 5 are preferably of a hard phenolic resin composition, which may be filled with cloth or textile threads for added strength, and while the particular construction and shape of these rings shown in the drawing is suitable for most applications, it may be desired to form a more effective seal, for example, between the ring 43 or ring 70 and the commutator riser, at the armature end of the commutator, by forming a labyrinth seal. This may be done conveniently by providing intermeshing grooves and lands in the abutting ring and commutator riser surfaces extending around the ring and commutator.

With the construction of Fig. 1 or Fig. 5, adjustment of brush position is possible in the normal manner for generators of the type under consideration since rotation of the brush supporting ring 7, at least to the extent usually necessary to provide proper positioning of the brushes, merely moves the shield 11 or 47 with the brush holders and also moves nipple 20 or tube 51, band 10, and the vapor generator 12 or 48 about the axis of the electric generator.

Two specific types of vapor generator useful in my invention are illustrated in the drawings and described in detail above. My invention is not, however, limited to a combination including one or the other of these types of vapor generators but it is contemplated that other sources of vapor, or sources of humidified air, that is, air containing a certain amount of water or other vapor, may be employed. A suitable vapor generator, for example, is a main engine of an aircraft. Gasoline, diesel and jet engine exhausts, as is well known, contain some moisture vapor, and it is contemplated that a small volume of exhaust gases from an engine may be fed directly through a tube or pipe into the current collector chamber. Similarly, a mechanical nebulizer or fine spray producing device, such as those making use of the jet spray principle, may be used to provide vapor, which may be supplied to the commutator chamber as a gaseous medium comprising vapor alone, or comprising vapor mixed with air or with other gases.

Location of the vapor generator outside of the machine frame is convenient but not necessary, and it is contemplated that the vapor generator may be located within the frame but external to the housing, or within the housing itself, if desired. It may be practicable, under certain circumstances, for example, to locate the vapor generator within the armature, or within the commutator or collector ring structure, or within the space shown in Fig. 1 inside of ring 46 between end assembly 6 and commutator drum 45, or like space, each as may be applicable to the particular machine in which the invention is employed and in accord with the volume of water or other vaporizable substance necessary to last during the expected operating periods.

While the external vapor generators described in detail above may be used in conjunction with water or organic materials of the characteristics described, the organic materials, because of their ability to provide a lubricant atmosphere at much lower vapor concentrations with a resultant longer life and hence the ability to provide longer vapor lubricant protection per weight of material, are particularly adaptable to vapor generators or sources which are located inside the housing of the machine. Thus pads of compact fibrous materials, such as felt or other porous material including porous minerals, carbonaceous materials and metals, are positioned within the housing of the machine and in close-spaced relation to the commutator so that the vapors issuing therefrom have access to the commutator surface. It has been found that special means to heat such internally mounted vapor sources is unnecessary, the normal heat generated in the commutator by brush friction providing sufficient heat to vaporize the lubricant material.

The internal vapor source may assume any of a number of configurations or locations, the only limitation being that it be positioned close enough to the commutator surface to receive heat therefrom and that the vapor outlet be located within the shield surrounding the commutator. Typical installations are shown in Figs. 9, 11, and 12.

The machine shown in Fig. 9 is similar to that of Fig. 2 except that the external vapor generator, along with tube 20 and other vapor delivery means, is removed. Shield plates 74, 75 are shortened and provided with outwardly turned flanges 76 and 77 to receive a block of plastic or other durable insulating material 78, the inner face of which is in close proximity to the commutator surface. As more particularly shown in Fig. 10, there are within block or piece 78 preferably two holes 79 closed at the outer end by a removable member such as threaded plug 80. The inner end of the hole is preferably, although not necessarily, tapered as at 81 to a somewhat smaller size. Hole 79 is filled or packed with a porous or felt-like absorbent wick material 82, such as wool, pumice, and the like, which is capable of holding and retaining a relatively large quantity of material. If the filler material 82 is a material such as of fibers which does not retain its shape, a screen 83 or other retaining structure which permits the passage of vapor is placed over the inner outlet of the hole 79 to retain filler 82 within the hole. Of course, such retaining means is not necessary when filler 82 is a coherent mass.

The internal vapor source may be very readily adapted to various types of commutator shields. For example, Fig. 11 shows its use in conjunction with a commutator of the type shown in Fig. 6 as having an external vapor source. To provide for the internal source, outwardly extending flanges 84, 85, 86 and 87 are provided in shield 47 between each set of the brush admission holes and block 78 containing the internal vapor source, cemented or otherwise fixed therein as shown in Fig. 11. Means of adapting the internal vapor source to other types of shields will readily be devised by those skilled in the art.

The internal vapor sources may readily be replenished by removing plug 80 and adding the desired vapor producing material to the filler material 82. While any lubricant vapor-producing material may be used, including water, it is preferable that an organic material of the above-described characteristics be used for its greater life. For example, when hexaethylene glycol is used in each of eight internal lubricant vapor sources in a total weight of about thirty grams, the carbon brushes of an electrodynamic machine are lubricated for at least two hundred hours under full load.

In each of the illustrated embodiments of my invention the tube communicating between the vapor generator and the commutator chamber formed by the housing extends approximately radially outwardly from the housing. The tube need not, however, supply vapor through the housing itself, but may be arranged to supply the vapor through a passageway formed, for example, through the central solid portion of end assembly 6. Such passageway might be adjacent and parallel to the axis of bearing and journal 4. Other suitable arrangements and modifications of construction of this nature will readily suggest themselves. It will also be apparent that the vapor generator may be located so as to communicate directly with the enclosed chamber to eliminate the intercommunicating tube, or that the tube may be replaced by a passageway formed in some other appropriate portion of the frame of the machine.

Accordingly, while I have shown only certain preferred embodiments of my invention by way of illustration, many modifications will occur to those skilled in the art and I, therefore, wish to have it understood that I intend, in the appended claims to cover all such modifications as fall within the true spirit and scope of my invention.

What I claim as new and desire to secure by Letters Patent of the United States is:

1. In an air-cooled electrical machine comprising a current collector device and relatively slideable current collector contact member in engagement with said device, the method of minimizing wear at the area of engagement of said device and member comprising the steps of shielding said area from the cooling air and providing to said shielded area a gaseous medium comprising a vapor.

2. In an electrical machine comprising a relatively rotatable current collector device and engaging current collector contact member subject to wear in the area of said engagement, a housing enclosing said device and at least the engaging area of said member in a substantially airtight chamber, and, in communication with said chamber, an external source of lubricating vapor at a pressure greater than that existing within and about said housing whereby said vapor may be injected from said source into said chamber to lubricate said area of engagement.

3. In an electrical machine comprising a rotatable current collector device and an engaging carbonaceous brush subject to wear against said device, a housing enclosing at least the engaged portions of said brush and device in a substantially gastight chamber, an external source of vapor, and a conduit communicating between said source and said chamber, said source being adapted and arranged to provide a gaseous atmosphere comprising a brush lubricating vapor to said conduit at a pressure greater than that existing in said chamber.

4. In a dynamoelectric machine having a current collector device and at least two current collector contact members in engagement therewith, an electrically conductive shield member disposed between said two contact members and an insulating member interposed between said two contact members arranged as a part of a substantially airtight shield between said two contact members to prevent the establishment of a short circuit connection through said conductive shield member between said two contact members, additional means to complete said shield to enclose at least the collector-device-engaging portions of said contact members and the portions of said device subject to engagement by said contact members in an at least partially airtight chamber, said last means comprising insulating means, and means to inject vapor into said chamber.

5. In a dynamoelectric machine comprising a frame, an armature and collector device mounted for rotation within said frame, a brush holder within said frame and supported therefrom, and a brush in said holder in engagement with said element, a shield enclosing in a substantially airtight chamber said collector element and at least the element-engaging portion of said brush, and a source of brush lubricating vapor, said source comprising means for injecting said vapor into said chamber.

6. In an air-cooled electrical machine comprising a relatively rotatable current collector device and engaging current collector contact member subject to wear in the area of said engagement, a housing enclosing said area in a substantially airtight chamber, said housing being in proximity to said device thereby to minimize interference with the flow of cooling air to said machine, and, in communication with said chamber, a pressure source to provide a gaseous medium comprising a vapor, the pressure of said medium being greater than that existing within and about said housing whereby said vapor is injected into said chamber to lubricate said area of engagement.

7. In an air blast cooled dynamoelectric machine for use at high altitudes and comprising a rotatable current collector device and engaging current collector contact member, a member of sheet material formed about said device enclosing at least the area of engagement of said device and said contact member in a substantially airtight chamber, said sheet material being arranged in proximity to said device thereby to permit substantially unaffected flow of said air blast and external cooling of said sheet material member by said blast, and external means comprising a vapor source for providing under pressure to said chamber a gaseous medium comprising a vapor, the pressure of said medium being greater than the pressure external to said housing at least at one non-airtight portion thereof.

8. In a dynamoelectric machine having a commutator and a cooperating brush engaging said commutator, a shield surrounding said commutator to form a substantially airtight enclosure therefor, said brush extending through said shield to engage said commutator, electrically insulating means insulating said shield from said commutator, and a source of vapor in communication with said enclosure for providing a lubricating atmosphere within said enclosure for said brush and commutator.

9. In a dynamoelectric machine having a frame, and a current collector device and cooperating contact member disposed within said frame, a shield within said frame enclosing said device and at least the cooperation portion of said member in a substantially airtight chamber, an enclosed tank external to said frame adapted to hold a volume of vaporizable material, means to vaporize said material, means forming a passage communicating between said tank and said chamber, and means to provide a gaseous medium into said tank under pressure whereby said medium is laden with vapor and injected through said passage into said chamber.

10. In a dynamoelectric machine having a current collector device and a plurality of current collector contact members in slideable engagement therewith, spaced apart holders for said members, a shield disposed to form a chamber for said device and the cooperating portions of said members, said shield comprising a plurality of conductive members arranged to project from each said holder toward the next in each direction and an insulating member interposed between each pair of said conductive members which extend toward each other to complete the shield between successive holders, and means to maintain appreciable vapor pressure within said chamber with respect to that outside the chamber.

11. In a direct current aircraft generator comprising an elongated cylindrical frame, an armature and associated commutator arranged for rotation in a bearing in said frame, and a plurality of brush holders supported by said frame and disposed therein adjacent to said commutator, said brush holders being adapted to retain brushes against said commutator, a shield member sealed to each of said brush holders and extending between each successive one of said brush holders thereby to encircle said commutator, said member being partially sealed against an end portion of said commutator through a short gap arranged to permit said commutator to rotate within said shield, said member also being sealed through said bearing to the other end of said commutator thereby to provide a chamber for said commutator, and humidifying means comprising a source of water vapor communicating with the interior of said chamber.

12. In a dynamoelectric machine comprising a substantially cylindrical rotatable current collector device and a plurality of current collector contact members arranged in holders disposed approximately equidistantly circumferentially about said device, a substantially flat conductive plate attached to each side of each of said holders extending toward the adjoining holder, an insulating member positioned between each pair of adjoining plates between each pair of adjoining holders thereby to insulate the plates attached to each one holder from the plates attached to the adjoining holders, said plates being positioned out of contact with said device, said insulating member being proportioned and arranged to approach closely the surface of said device thereby to increase the turbulence of the atmosphere surrounding said device, and means to increase the vapor pressure of said atmosphere.

13. In a dynamoelectric machine comprising a substantially cylindrical rotatable current collector device and current collector contact means arranged in holders disposed circumferentially about said device, a plate attached to each side of each of said holders, extending toward the adjoining holder, an insulating member positioned between each pair of adjoining plates between each pair of adjoining holders thereby to insulate the plates attached to each one holder from the plates attached to the adjoining holders, said plates being positioned out of contact with said device, said insulating member being proportioned and arranged to approach closely the surface of said device thereby to increase the turbulence of the atmosphere surrounding said device and means to increase the vapor pressure of said atmosphere, said means comprising a vapor-producing material located within said insulating member.

14. In a dynamoelectric machine having a current collector device and current collector contact member engaging said collector device, a shield enclosing said collector device and at least that portion of said contact member in engagement therewith, a source of vapor mounted in said shield, said source comprising an insulating member defining a cavity in which is positioned an absorbent material containing a lubricant vapor-producing material.

References Cited in the file of this patent

UNITED STATES PATENTS

| | | |
|---|---|---|
| 471,693 | Goolden | Mar. 29, 1892 |
| 1,116,871 | Bliss | Nov. 10, 1914 |
| 1,922,191 | Baker | Aug. 15, 1933 |
| 2,106,842 | Hague | Feb. 1, 1938 |
| 2,393,066 | Rose | Jan. 15, 1946 |
| 2,502,830 | Crise | Apr. 4, 1950 |

FOREIGN PATENTS

| | | |
|---|---|---|
| 226,517 | Great Britain | May 28, 1925 |

OTHER REFERENCES

"Carbon Brush Contact Films," by R. H. Savage, Gen'l Elec. Review, pages 13 and 14, Oct. 1945.